June 17, 1952  F. L. McCLAIN  2,600,899
DENTAL APPLIANCE
Filed Jan. 7, 1949  4 Sheets-Sheet 1
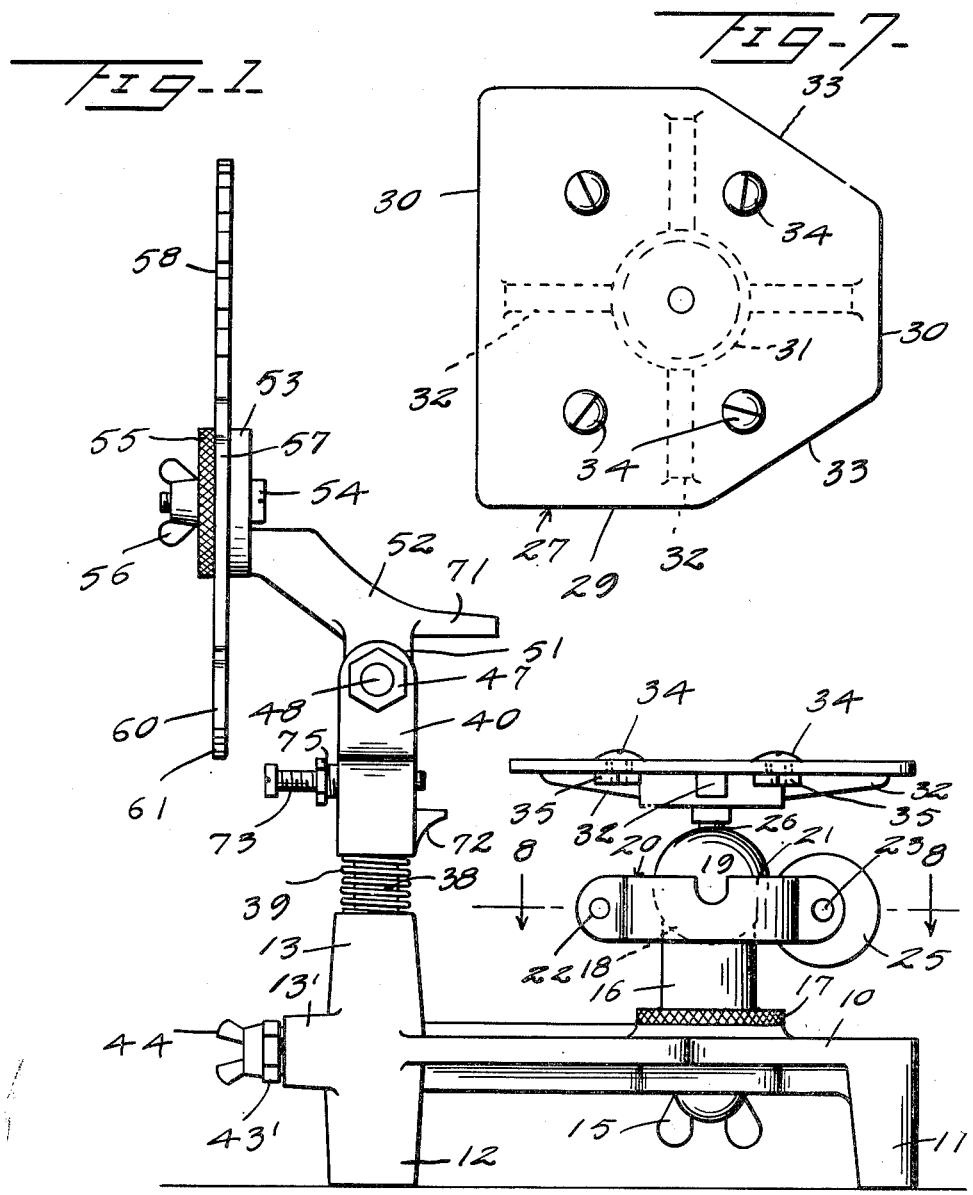
Inventor
F. L. McClain
By Kimmel & Crowell
Attorneys

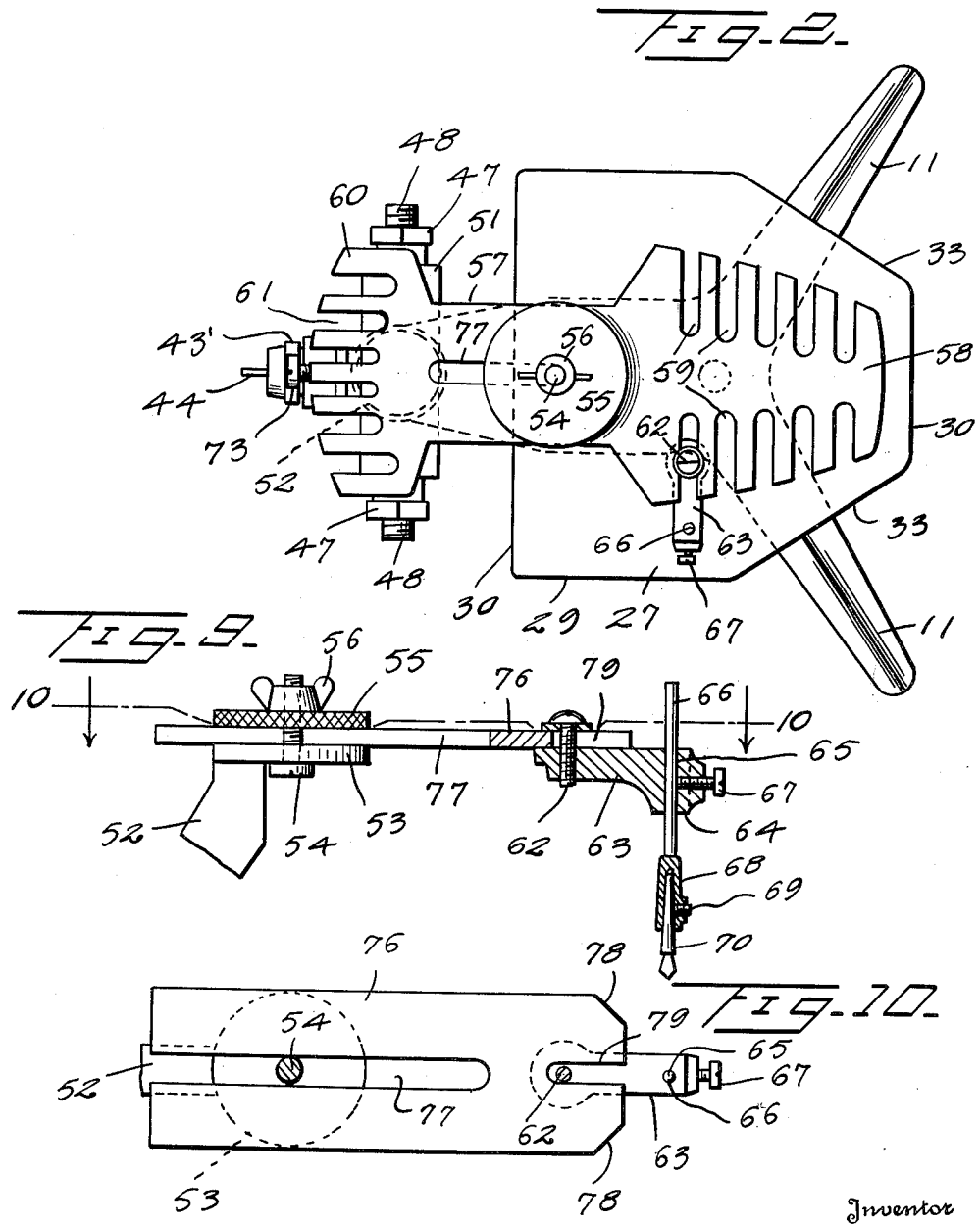

June 17, 1952 F. L. McCLAIN 2,600,899
DENTAL APPLIANCE
Filed Jan. 7, 1949 4 Sheets-Sheet 3
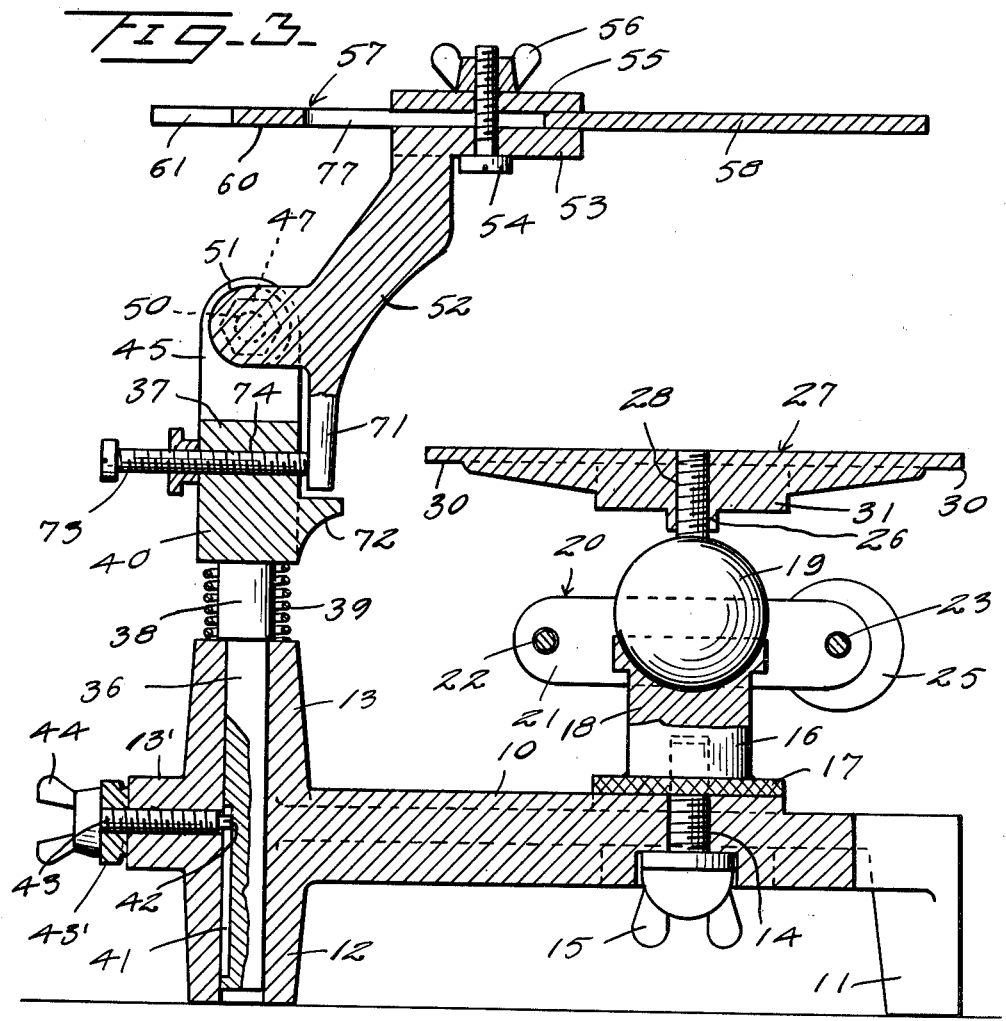
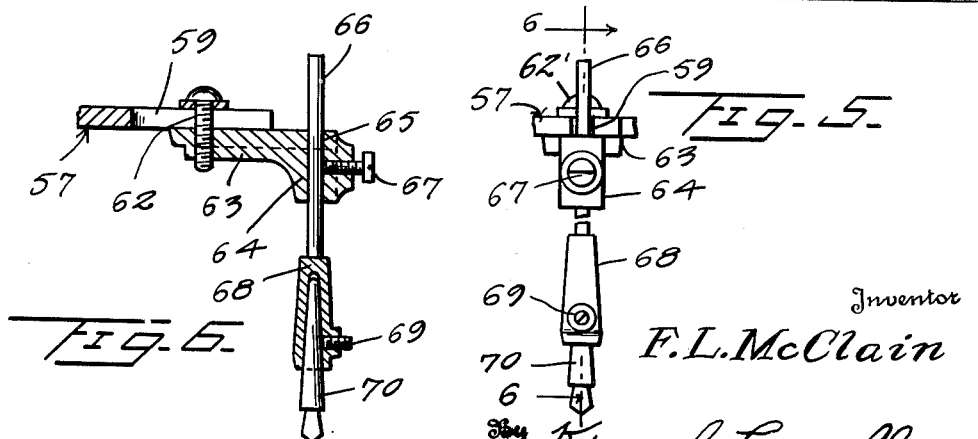
Inventor
F. L. McClain
By Kimmel & Crowell
Attorneys June 17, 1952  F. L. McCLAIN  2,600,899
DENTAL APPLIANCE
Filed Jan. 7, 1949  4 Sheets-Sheet 4
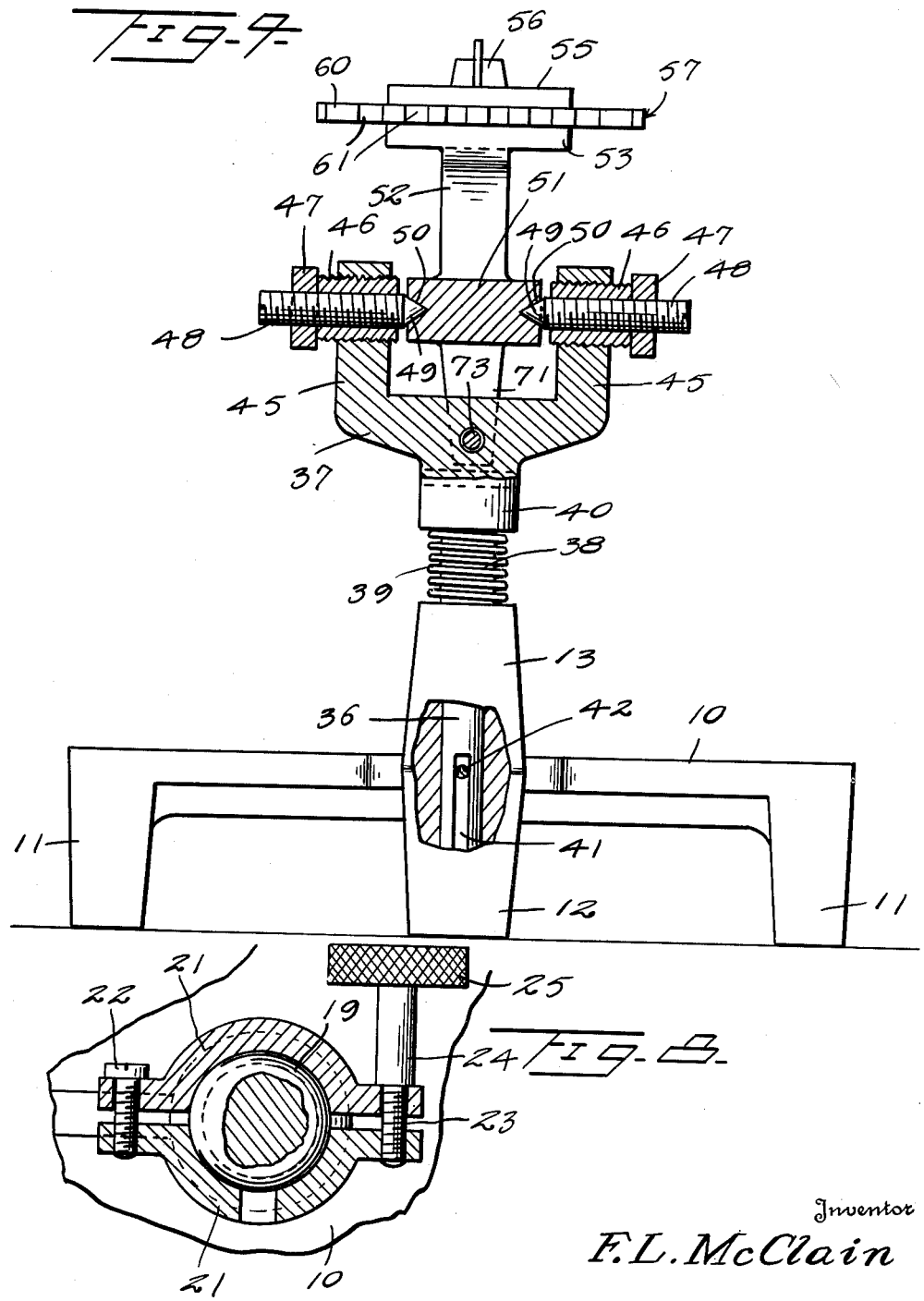
Inventor
F. L. McClain
By Kimmel & Crowell
Attorneys Patented June 17, 1952

2,600,899

UNITED STATES PATENT OFFICE 2,600,899

DENTAL APPLIANCE

Francis L. McClain, Jacksonville, Fla.

Application January 7, 1949, Serial No. 69,751

3 Claims. (Cl. 32—32)

My invention relates to a dental appliance and process for use in practicing restorative dentistry of a precise nature in making dies and models for inlays, crowns, artificial teeth, bridges both removable and permanent, and in accurately aligning the teeth with the tooth sockets in connection therewith and in plates, so that the teeth can be aligned perfectly with the tooth sockets or recesses produced in the plaster mold or model cast from the elastic or wax impression formed in the mouth with particular reference to the alignment of the teeth to the sockets or recesses therein produced from the impression of the mouth for any one or more teeth up to 16, the maximum number of teeth contained in either dental arch, and so that they will be properly related parallel to each other and in alignment in rows horizontally in the arch or at the same height in the completed dental construction or restoration.

The invention comprehends an improved and novel dental appliance embodying a supporting base upon which is supported a stage capable of vertical and angular adjustments for mounting a dental elastic or wax impression which is attached or anchored to the stage by matricing with plaster-of-Paris and a plaster model with recesses made into teeth selected as abutments, and having an upper support or antero-posterior carrier arm or bow with means for supporting dowel pins for vertical and angular adjustment in proper relation to each other and relative to the centers of the teeth or those selected as abutments or anchors into which the die material, fillings, or inlays are to be introduced with accuracy and precision to indicate and so that the operator will be advised at the time of tooth preparation, the minimum amount of tooth structure that need be removed or sizes of cavities required as an accurate guide both to the operator or dentist and technician to meet the ideal requirements mechanically of the planned case, said upper support or carrier being so articulated to its turret and the latter to its base standard as to be capable of varied or a plurality of adjustments vertically and swingably in a vertical plane, laterally and horizontally adapting it to practically all possible constructions and restorations including most favorable angle of insertion of the dowel pins into the centers of the prepared teeth and for the placement of teeth, abutments, anchors, inlays, saddles and connecting bars as to normality or abnormality of teeth used as abutments, maximum depth gingivally that the attachments may be placed without undue removal of tooth structure with particular reference to the selection of attachments that are more narrow bucco-lingually or labio-lingually than the finished length indicated occluso-gingivally, mesially or distally and so that proper articulation and occlusion may be effected.

The invention further embodies a dental appliance with a base on the front and top portion of which is mounted an adjustable stage having a ball and socket or universal joint connection vertically adjustable on the base, a vertical bearing socket at the back in which the shank or stem of a yoke is resiliently supported for vertical adjustment to pivotally mount a turret or arm swingable vertically and supporting an overhanging horizontal carrier on a vertical axis on the head thereof capable of longitudinal and rotative or lateral adjustment on said vertical axis and having dowel pin supporting arms on which the restorative inlays, teeth or the like are mounted to accurately fit in the tooth sockets or recesses provided in the arches so that the most efficient restoration may be accomplished.

With the above and other objects in view, my invention consists in the arrangement, combination and details of construction disclosed in the drawings and specification, and then more particularly pointed out in the appended claims.

In the drawings,

Figure 1 is a side elevation of dental appliance constructed in accordance with the invention, Figure 2 is a top plan view of the device, Figure 3 is a central vertical sectional view, Figure 4 is a transverse sectional elevation looking at the back of the device, Figure 5 is a fragmentary side elevation of a carrier bow and lateral arm thereon, Figure 6 is a section taken on the line 6—6 of Figure 5, Figure 7 is a top plan of the stage, Figure 8 is a section taken on the line 8—8 of Figure 1, Figure 9 is a sectional side elevation of a special carrier bow and lateral arm, Figure 10 is a sectional plan view taken on the line 10—10 of Figure 9.

Referring to the drawings in detail, the dental appliance comprises a horizontal supporting base 10 mounted on a pair of spaced front corner legs 11 and a central tubular rear leg 12, all of which may be formed as a part of a single casting in which the leg 12 is extended vertically to form a tubular bearing socket 13. Centrally in spaced relation to the front legs or feet 11, the base 10 is provided with a smooth vertical bore 14 to take a wing or knurled head screw 15 acting into a central bearing stud 16 having a knurled flange 17 by which it may be attached and locked in the desired rotative position by said wing or knurled head screw.

The stud 16 is provided at the top with a semi-spherical socket 18 of a universal or ball and socket joint including a ball or sphere 19 seated therein for angular and rotative adjustment and held in position by a two-part clamp 20. The clamp 20 comprises jaws 21 formed with apertured ears at their front and rear ends connected by a screw 22 at the back and a screw 23 at the front. The screw 23 is somewhat elongated at its shank 24 and has a knurled or milled knob 25 by which it may be turned with facility to clamp the ball in adjusted position or to release the same for adjustment as desired. Supported on the ball 19 through the medium of its vertically extending reduced threaded shank or stem 26 is a flat stage 27 having a threaded bore 28 for receiving said stem for securing the stage to the stem. The stage 27 in plan is as disclosed more particularly in Figure 7 of the drawings, the stage being provided with parallel side edges 29 and front and rear edges 30 and a central thickened depending portion 31 and stiffening ribs 32 arranged in intersecting relation at right angles to each other as seen in dotted lines in Figure 7, and is generally of rectangular shape with beveled corners 33 at the front.

The flat surface of the stage is provided with four spaced bores to receive machine screws 34 and countersunk underneath to receive retaining nuts 35; the machine screws acting as keys for a plaster-of-Paris matrix.

The tubular vertical bearing socket 13 at the back receives an elongated circular depending shank 36 of a pivot yoke 37 formed with an enlarged portion 38 above the shank 36 forming a shoulder at the bottom thereof to engage the top of the socket 13. An expansible coil spring 39 is disposed on the cylindrical enlargement 38 between the top of the socket 13 and the hub 40 of the yoke 37 to resiliently support the yoke. The shank 36 is provided with a longitudinal keyway or groove 41 in its periphery and lower portion a boss 13' with a threaded bore receiving a screw 43 bearing a nut 43' to lock same, and the keyway 41 being adapted to receive the reduced inner end 42 of a locking screw 43, preferably having wings 44 to facilitate its manipulation and clamp the shank 36 and yoke 37 in vertically adjusted position or to hold it down and the spring 39 compressed so that when released, the spring will serve to resiliently elevate the yoke until the bottom of the keyway or groove 41 strikes the end 42 of the screw 43. The arms 45 of the yoke 37 extend upwardly to receive interiorly threaded bearing sleeves or nuts 46 having wrench or knurled heads 47 at their outer ends and through which needle point screws 48 are adjustable so that the tapered or needle point inner ends 49 thereof seat in conical recesses 50 in the ends of a horizontal bearing 51 of a pivoted and swingable turret or arm 52 which is offset forwardly and extends upwardly in an inclined position over the base. At the top, the turret 52 is provided with a circular horizontal head 53 centrally apertured to receive a clamping screw 54 to mount between it and a clamping disc 55 held by a nut 56 on the upper end of the screw, a horizontal upper supporting or antero-posterior carrier arm or bow 57.

This bow is in the form of a flat plate of the outline shown more particularly in Figure 2 of the drawings, in which the front portion is provided with a forwardly tapered enlargement 58 narrowed at the back to the size of the disc 55 and formed with a plurality of spaced parallel aligned slots 59 extending inwardly from its forwardly converging side edges and with its front end terminating in spaced relation to the front edge of the stage 27. The bow 57 is formed with a central reduced portion and the rear end is provided with an oppositely tapered enlargement 60 having its rear edge cut on an arc and formed with a plurality of longitudinally extending slots 61 spaced apart in parallel relation from its rear edge and perpendicular to the transverse slots 59 in the front enlargement 58. The slots 59 and 61 are designed to receive vertical clamp screws 62 for supporting horizontal arms 63 for adjustment lengthwise of the slots and angularly at different angles on the screws 62 and preferably beneath the carrier bow 57 in such a manner as to straddle the slots as more particularly shown in Figures 5 and 6 of the drawings.

The arms 63 have thickened bearings 64 at their free ends each with a vertical bore 65 therethrough for receiving dowel pin mandrels 66 which are held in vertically adjusted position by set screws 67 through horizontal threaded apertures in the bearings 64. The lower ends of the mandrels are enlarged as indicated at 68 and provided with adjustment screws 69, the enlargements having sockets to receive dowel pins 70, plates or other recess or cavity engaging means in artificial teeth, inlays or other corrective and restorative parts such as referred to. It will be noted that the arms project out from the sides of the bow 57 and may be angularly adjusted in addition to being adjusted in and out in the slots 59 over the stage 27 and that the pivot of the turret arm 52 allows the latter to be swung so that the bow 57 is in parallelism with the stage 27 above the latter as shown in Figures 2 and 3, or swung vertically on the pivots 49 as a horizontal axis to a vertical position as shown in Figure 1. To limit the movement of the turret arm to the position shown in Figure 3, it is provided with a depending lug 71 at the front and the central portion 40 of the yoke 37 has a stop lug 72 extending forwardly beneath the depending lug 71 to limit such movement. An adjustable set screw 73 operates through a threaded bore 74 horizontally through the part 40 to engage in back of the depending lug 71 to limit and adjust the position of the turret arm so that the bow 57 will be in proper relation to the stage 27 and preferably in spaced parallel relation thereto and above the same. A lock nut 75 is mounted on screw 73 to hold the latter in adjusted position.

In Figures 9 and 10 of the drawings, a special form of horizontal bow 76 for use in place of bow 57 is disclosed, the same being in the form of a strip of uniform width having an elongated slot 77 at its inner end for engagement by the clamping screw 54 constituting a vertical pivot axis therefor and adapted to be held by the nut 56. The front end of the strip or bow 76 is preferably beveled as indicated at 78 at opposite sides and is formed with a longitudinal slot 79 opening through its front end to support the arms 63 and parts carried thereby as described in connection with the other figures and particularly Figures 5 and 6 of the drawings. In this form the slot 79 corresponds to the slots 59 except that the latter are transversely disposed instead of longitudinally. Also, it is to be understood that the bow 57 may be reversed in position from that disclosed in Figure 2 so that the slots 61 of the enlargement 60 thereof, shown at the rear, may be disposed at the front in conformity with either dental arch and for the same purpose as the slot 79 in supporting an arm 63, except that a plurality of such arms may be so supported and adjusted angularly as well as longitudinally in and out on the pivot axis 62 constituting the clamping screw for the arm. In addition, the bow may be angularly adjusted for proper alignment above the stage on the vertical clamping screw 54 as a vertical axis as previously pointed out, in addition, to the longitudinal adjustment permitted by the slot 77 in connection with the special horizontal bow 76 disclosed in Figures 9 and 10. This assembly is to relate various parts of the precision attachments to the dies of the prepared teeth, while the mandrel or mandrels may be related to any point on the stage 27 so that proper alignment vertically may be obtained for accurate insertion in the most favorable position of the inlay, artificial teeth or other part of the restorative dentistry and with the tooth sockets or recesses produced in the plaster mold or model cast from the elastic or wax impression so that the complete project will accurately lock the teeth or inlays of the restorative part, plate, bridge whether removable or permanent, and in respect to any one or more of the teeth up to 16, the maximum number of teeth contained in either dental arch, so that they will be properly related parallel to each other and in alignment in rows horizontally in the arch and at the same height in the completed dental construction or restoration.

In the function and operation of the appliance, the device is a multiple surveyor and relator upon which one or more integral parts of dental models and appliances may be related parallel to each other, then raised out of relation on an arc on the pivots 49 as a horizontal pivot axis, by swinging the turret 52 upwardly from the position shown in Figures 2 and 3 to the position shown in Figure 1, so that an interfering medium such as gypsum die materials or dental inlay and casting waxes may be introduced and the integral parts thus assembled may then be returned to their pre-related positions at precisely the same settings when swung forwardly in a vertical plane with the turret to the position shown in Figures 2 and 3 in which they originally appeared. After the die material has set or the dental wax has become rigid, the mandrels 66 may be raised clear of the integral parts in a vertical direction by adjustment thereof or with the turret 52 and carrier bow 57 without disturbing the relative positions of the parts and, by reason of the adjustments provided, almost unlimited adjustability and rigidity in connection with the unique combination of movements, places in the hands of the dental profession and its allied industries a precision instrument designed to aid in the construction of precision sectional models when an elastic dental impression technique is employed as will be more fully described hereinafter. It also aids in the construction of broken stress fixed bridges by relating the mandrels or arms constituting the female parts of the lock rests to the tooth cavity surface prior to making the abutment casting, the greatest advantage being that these rests may be placed with a higher degree of precision and far more speedily with the present dental appliance than with any instrument or technique available at the present time. It also aids in the construction of dental parts or appliances employing precision attachments since the female parts of the attachment may be related to the prepared surfaces of the teeth to be utilized as abutments prior to connecting the casting and in this type, each precision attachment must be parallel with all other attachments that are connected and such precision attachments may be placed with greater accuracy and more closely to the prepared teeth, thereby eliminating undue grinding when the abutment teeth are prepared by the employment of the present device.

Further, the device aids in the construction of removable partial dentures involving the use of clasps and the sectional model with parallel dowel pins as described, allows any portion of a dental casting for a removable bridge to be fitted to its corresponding section of the model without interference from any other part of the model. Although the present device may be utilized to advantage in connection with many techniques and procedures where relating of integral parts is indicated, it has been designed primarily to aid in carrying out the laboratory procedures involved in the construction of fixed and removable bridges, inlays, crowns and the many combinations of restorative units when an accurate elastic impression obtained in accordance with modern accepted principles is presented as a basis for construction.

In one technique or use of the appliance or instrument for the construction of sectional models with parallel precision dies, the elastic impression is trimmed of excess material and cleaned with a thin plaster wash. The impression is oriented to the stage 27 and the plaster matrix constructed to relate the impression tray thereto with no undercuts and the impression covered with cotton saturated with 2% potassium sulphate solution and the plaster allowed to set. The turret, carrier bow and dowel pin mandrels are then adjusted for the most favorable angle for insertion of the dowel pins 70 into the centers of the prepared teeth, this being facilitated by the angular adjustments of the arms 63 in the slots as described with the occlusal plane normally parallel to the horizontal. The ball and socket assembly mounting the stage 27 after being properly adjusted and fastened by the operation of the clamp assembly 20 through the medium of the adjustment screw 23 by the knob 25, the upper assembly including the turret and carrier bow are depressed and secured by the lock screw 43. The carrier bow 57 is then adjusted so that the selected impression areas may be reached with the dowel pins and the turret head locking wing nut 56 tightened to secure the carrier bow in adjusted position. The dowel pins are then inserted into the dowel pin mandrels at 68 and fastened by the screws 69 to secure them in position. The mandrels are then inserted in the lateral arms 63 and the latter are placed in the selected slots 59 or 61 of the carrier bow 57 and the arms and mandrels adjusted so that the dowel pin bases are related to the centers of the selected impression areas and then fastened by the set screws 62, 67 and 69. The dowel pins are then raised clear of the impression by arcing or swinging the turret 52 and assembly carried thereby from the position shown in Figures 2 and 3 to the position shown in Figure 1 and the impression released from the matrix, after which the dies are poured in the selected areas. While the die material is still soft in the matrix, the dowel pins are returned to their pre-related positions by gently tapping the carrier bow to settle the pins into the die material. The exposed impression material is then protected with cotton saturated with 2% potassium sulphate. When the die material has set, the dowel pin mandrel set screws 69 are released together with the wing nut 44 and set screw 43 for engagement with the keyway 41 at the end 42 of the screw, which allows the entire upper assembly to raise or be moved upwardly by means of the spring 39 to an elevated position by reason of the action of the spring on the base of the turret arm 52, limited by the lower end of the keyway or groove 41 so as to be raised clear of the dowel pin ends, apexes or apices. The impression is then transferred to a 2% potassium sulphate solution until the final set of the die material has taken place. If the dies are not built up too much, the exposed surfaces thereof are lubricated with a small amount of petroleum jelly, the impression boxed and the master model poured therein. When the master model has set it is separated from the impression, the base is trimmed as desired, the dowel pin apexes are exposed and the dies released by gently tapping the dowel pins.

Recesses may be cut to permit easy access to the dowel pin apices and fitted with carding wax and then the model articulated by using any suitable articulator, after which the case construction is proceeded with as indicated.

When an accurate elastic dental impression is made in accordance with modern accepted principles, such as conventional hydrocolloid impression technique, the impression is presented for the construction of inlays, crowns, fixed and removable bridges, precision attachment cases or combinations thereof which frequently occur.

As an alternate procedure, in many cases it may be necessary and advantageous to remove the dies and trim their respective bases before pouring the master model. When this is indicated, the following steps are suggested or employed to eliminate the possibilities for error. When the dies are completely set, the impression is soaked in body temperature water for about 5 minutes or submitted to full vacuum in water if a vacuum pump is available. The dowel pin apexes are firmly gripped with pliers and released with a straight quick pull and the bases of the dies trimmed conically using the dowel pins as guides. This can be done quickly with garnet paper discs and a sharp knife. The debris is rinsed therefrom and the dies coated lightly with petroleum jelly after which they are warmed slightly by passing them through a Bunsen burner and excess petroleum jelly removed and the dies pressed firmly into place in the impression.

Using melted carding wax, any undercuts around the gingival or gum lines of the dies are filled, the impression boxed and the master model poured. The master model is then trimmed, cutting recesses as suggested for easy access to the dowel pin apices. By the use of such technique as an adjunct to conventional laboratory procedure, precision accuracy without the high degree of skill formerly required can be routinely obtained and many time consuming steps eliminated, thereby reducing to a bare minimum the dimensional changes that invariably occur between the time the impression is taken and the completion of the master model. The dowel pins, being centrally located in the individual dies, offer a perfect guide for trimming the bases and the parallel dies facilitate the laboratory sequences involved in the construction of dental appliances or restorations while the pre-relating of the dowel pins eliminates the need for the usual bonding material thereby resulting in dies of greater strength.

In accordance with another technique, using the special bow and lateral arm for the precision attachment mandrels as disclosed, and especially in Figures 9 and 10, when the planning of a dental restoration utilizing precision attachments as a means of anchorage is begun, a plaster study model upon which recesses have been made into the teeth selected as abutments, indicates to the operator at the time of tooth preparation, the minimum amount of tooth structure that need be removed to meet the ideal requirements mechanically of the planned case. The almost unlimited adjustability of the present dental appliance is a definite aid in the working out of the case plan model. When a good plaster study model is obtained, it is indexed to the stage 27 and the latter adjusted for most favorable angle of insertion giving consideration to the angle of insertion best suited for the placement of saddles and connecting bars as well as the general case plan, normal or abnormal positions of teeth to be used as abutments, maximum depth gingivally that the attachments may be placed without undue removal of tooth structure and a selection of attachments should be made that are more narrow bucco-lingually or labio-lingually than the finished length indicated occluso-gingivally. When the angle of insertion has been developed by the adjustments of the various parts as described and the attachments best suited for the case have been selected, the female parts or mandrels are attached and affixed to the special lateral bow 63 and horizontal bow 76. The box or recess is then cut into each abutment tooth selected, working the female attachment on the dental device into the box as it is developed and allowing sufficient clearance for abutment casting pattern thickness. The next mandrel is then affixed and another box or recess prepared in a similar manner and so on until all of the abutment teeth have been prepared parallel to one another. This plaster model with the case plan serves as a guide both to the dental operator and the technician as construction of the case progresses.

When the abutment preparations have been fully developed in the mouth, an accurate elastic dental impression should be taken in accordance with the modern accepted principles of elastic impression procedure and construction of the sectional model begun. If this is not convenient at this time, the excess material is trimmed away and the same is washed with thin plaster and water mixture, thoroughly rinsed and immersed in 2% potassium sulphate solution.

In the procedure for relating the female attachments or mandrel members to the abutment preparations and construction or formation of the abutments, after the sectional model has been made, articulated and the abutments tentatively carved in inlay wax, the model is removed from the articulator, the inlay wax patterns laid aside and the sectional model indexed, preferably with plaster to the stage 27 as by means of the screws 34 and nuts 35 and the stage adjusted to the most favorable angle of insertion by reference to the plaster case plan model. With the attachment fixed to the mandrel and to the lateral arm and horizontal bow forming a support therefor, the same is adjusted laterally and vertically so that the attachment is related to the abutment box or recess preparation to the desired depth, both gingivally and mesially or distally toward the axial surface of the box allowing space for the inlay wax thickness between the box and the attachment. The parts are then secured tight by means of the set screws and the attachment raised away from the abutment die utilizing the swinging or arc movement of the turret and then replacing the wax pattern on the die. The mandrel is then lubricated together with the inner surface of the attachment as by means of any suitable lubricant and the attachment occluded with the wax pattern and by heating the mandrel shank with a hot spatula, allowing the attachment to return to its pre-related position. The lug or extension 71 of the turret must be in full contact with the horizontal adjustment screw 73 and the excess wax may be trimmed and the mandrel carefully lifted vertically out of the bore in the arm 63 by releasing lock screw 67. The wax pattern is then perfected to full contour and with a sharp carving instrument a light ditch is cut around the proximal contact plate of the attachment. This is repeated for each abutment without changing the angle of the stage nor the horizontal setting of the turret. The margins of the wax patterns are checked, sprued and invested, using hygroscopic investing technique for best results. The abutments are then burned out and cast, the castings cleaned up and pickled after which they are fitted to their abutment dies and the coacting attachments fitted together. The ditches are filled with a high karat solder and the model returned to the articulator to perfect the occlusion and finishing of the attachments occlusally and to perfect the margins of the abutment inlays with the grinding of the male attachments to occlusion omitted at this time.

The saddles and bars in the construction of cast frames are designed and reliefs applied where indicated and a duplicating elastic impression for the casting model is poured. The abutments and dies are lubricated and transferred to the duplicating impression after which the undercuts are waxed out where necessary for subsequent removal of the dies, being careful to preserve the gingival areas next to the attachment surfaces of the abutments and then pouring the casting investment model. This model is then trimmed and the dies separated from it, being careful not to break down the truss arm approaches. The case design is then transferred to the casting model and the case waxed up to the truss arms. The dies, abutments and attachments are then lubricated and returned, and the truss arms waxed by flowing the wax under the proximal contact shanks up the mesial or distal vertical surfaces. The case is then sprued for casting, the dies removed with the abutments and attachments, exposing the die seats to avoid entrapment of air and then invested using the best technique that can be chosen. The same is then burned out and cast, the case pickled and the greater part of the finishing completed before assembly for soldering. In assembling the cast frame and attachments, all of the integral parts are fitted together on the master sectional model, all points of strain being relieved by carefully grinding the abutting surfaces of the truss arms until the male attachments can be removed and replaced into their positions between the abutments and the truss arms.

The silver wires of the male attachments are then warped closely to selected areas of the frame and joined together with a good grade of sticky wax and when the wax has chilled, the cast frame, abutments and dies are lifted simultaneously from the sectional model and the abutments and dies carefully removed from the male attachments. Any voids which appear are carefully filled where soldering investment is not desired and the exposed portions of the attachments coated with anti-flux such as rouge dissolved in chloroform and the case invested for soldering, being careful to fill the grooves between the T-heads of the attachments. When the investment has set, the sticky wax is flushed out with boiling water to which borax or other good cleansing agent has been added and the excess investment carefully trimmed away with a sharp knife, so as to eliminate unnecessary bulk and then again flushed out and liquid soldering flux applied to the joints, after which the same is transferred to a medium or low flame and preheated for soldering.

The silver wires are removed as each truss arm and male attachment is brought to soldering temperature and the joints soldered with a high karat solder. The case is then cleaned and pickled and heat treated if desired. The male and female attachments are then carefully fitted together, checking the frame on the sectional model, reducing any unnecessary solder and placing the dies in their respective abutments, after which the case with the dies is put in place on the model and the occlusion perfected. The teeth to be replaced are then set up and the case may be tried out in the mouth if desired, after which the same is processed and finished as indicated. The gingival areas of the saddles as they approach the attachments are carefully finished to prevent interference with the seating of the attachments and it is preferable that the processing be done without the abutments whenever possible because it is difficult to separate them if the denture base material flows into the minute spaces between the attachment parts.

Assuming that an accurate elastic impression is presented as a basis for construction, and the laboratory procedures minutely followed, precision attachment cases may be constructed with greater ease and accuracy since all of the component parts can be properly fitted together and accurately related to one master sectional model and assembled on the same model to result in precision cases that more nearly meet the accepted mechanical, functional and esthetic requirements. Also, many of the time consuming steps that are constantly involved in precision attachment techniques being advocated and employed today are eliminated because of the comparative ease with which paralleling and relating of the component parts of the appliance to the abutment preparations of the teeth can be achieved through the use of the device constituting the present invention.

I do not mean to confine myself to the exact details of construction herein disclosed but claim all variations falling within the purview of the appended claims.

What I claim is:

1. A dental appliance of the class described, comprising a lower assembly including a base, a stage mounted on and above the base for vertical and angular adjustment in a circular path, an upper assembly including a turret swingably mounted for movement in a vertical plane, a carrier bow mounted on the turret and adapted to be positioned horizontally above the stage or pivotally swung rearwardly thereof to a vertical position, said member having at least one slot therein, a bolt engageable in said slot and secured to a mandrel supporting member for receiving and holding an angularly adjustable mandrel supporting arm movable in a horizontal plane.

2. A dental appliance of the class described, comprising a lower assembly including a base, a stage mounted on and above the base for vertical and angular adjustment in a circular path, an upper assembly including a turret swingably mounted for movement in a vertical plane, a carrier bow mounted on the turret and adapted to be positioned horizontally above the stage or swung rearwardly thereof to a vertical position, means for adjusting said member horizontally on a vertical axis, said member having parallel slots arranged transversely at opposite sides and longitudinally at the opposite ends, mandrel supporting arms, bolts secured to said arm and secured in said slots by said bolts and adjustable lengthwise thereof by movement of said bolts, and parts supporting said mandrels for vertical adjustment in the arms.

3. A dental appliance comprising a horizontal base, a stage having a universal joint mounted on the base and positioned above the same, a yoke vertically slidable at the rear of the base and adapted to be held in vertically adjusted position, means resiliently supporting the yoke and adapted upon release of the last named means to normally elevate the same, a turret pivoted on the yoke and having an extension, means on the yoke coacting with the extension to adjust the angular position of the turret in a vertical plane, a carrier member pivoted on the turret for horizontal movement on a vertical axis over the stage and adapted to be pivoted away from the stage to a vertical position, said member having slots, mandrel supporting arms having bolts secured thereto, said bolts being engageable with certain of said slots for securing said arms to said carrier member, means for angularly adjusting said arm horizontally and longitudinally over the stage, said dowel pins having mandrel supporting dowel pins vertically adjustable in the arms and having means to engage a recess in a dental restorative part.

FRANCIS L. McCLAIN.

REFERENCES CITED

The following references are of record in the file of this patent:

UNITED STATES PATENTS

| Number | Name | Date |
|---|---|---|
| 501,741 | Simpson | July 18, 1893 |
| 619,586 | Lewis | Feb. 14, 1899 |
| 1,314,223 | Sorensen | Aug. 26, 1919 |
| 1,354,089 | Callsen | Sept. 28, 1920 |
| 2,376,384 | Ringle et al. | May 22, 1945 |

FOREIGN PATENTS

| Number | Country | Date |
|---|---|---|
| 566,447 | France | Feb. 14, 1924 |